US007222092B2

(12) United States Patent
Grove et al.

(10) Patent No.: US 7,222,092 B2
(45) Date of Patent: May 22, 2007

(54) SYSTEM AND METHOD FOR SUBMITTING AN OFFER TO PURCHASE OVER A NETWORK-BASED COMMERCE FACILITY

(75) Inventors: Steve Grove, San Jose, CA (US); Kevin Dulsky, Redwood City, CA (US); Zak Edson, Campbell, CA (US)

(73) Assignee: eBay Inc., San Jose, CA (US)

( * ) Notice: Subject to any disclaimer, the term of this patent is extended or adjusted under 35 U.S.C. 154(b) by 101 days.

(21) Appl. No.: 10/444,916

(22) Filed: May 22, 2003

(65) Prior Publication Data

US 2004/0133479 A1 Jul. 8, 2004

Related U.S. Application Data

(60) Provisional application No. 60/438,607, filed on Jan. 7, 2003.

(51) Int. Cl.
*G06Q 30/00* (2006.01)
(52) U.S. Cl. .............................. 705/26; 705/4; 705/22; 705/27; 705/37; 705/38; 715/17; 715/33
(58) Field of Classification Search .................... 705/4, 705/22, 26, 27, 37, 38, 1, 36 R; 715/717, 715/733
See application file for complete search history.

(56) References Cited

U.S. PATENT DOCUMENTS

| 5,493,490 | A | * | 2/1996 | Johnson | 705/26 |
| 5,778,178 | A | | 7/1998 | Arunachalam | |
| 5,956,024 | A | * | 9/1999 | Strickland et al. | 715/717 |
| 5,987,500 | A | | 11/1999 | Arunachalam | |
| 6,006,201 | A | * | 12/1999 | Berent et al. | 705/27 |
| 6,041,310 | A | * | 3/2000 | Green et al. | 705/27 |
| 6,125,356 | A | * | 9/2000 | Brockman et al. | 705/37 |
| 6,212,556 | B1 | | 4/2001 | Arunachalam | |
| 6,484,153 | B1 | * | 11/2002 | Walker et al. | 705/38 |
| 6,910,187 | B2 | * | 6/2005 | Felkey et al. | 715/733 |
| 2002/0023004 | A1 | * | 2/2002 | Hollander et al. | 705/22 |
| 2002/0152157 | A1 | * | 10/2002 | Stoyanov et al. | 705/38 |
| 2002/0169640 | A1 | * | 11/2002 | Freeland | 705/4 |
| 2003/0036964 | A1 | * | 2/2003 | Boyden et al. | 705/26 |

OTHER PUBLICATIONS web pages of the cars.com web site published on Jan. 26, 2002, extracted from Internet on Jun. 25, 2005 , marked as pp. 1-11), hereinafter referred to cars.com.*

* cited by examiner

*Primary Examiner*—Yogesh C. Garg
(74) *Attorney, Agent, or Firm*—Schwegman, Lundberg, Woessner and Kluth, P.A.

(57) ABSTRACT

A system and method to facilitate a transaction in a network-based commerce facility is provided. The method includes presenting a plurality of listings to a user, and monitoring selection of one of the plurality of listings by the user. Thereafter, the user is provided with an indication of an equivalent periodic payment of a plurality of periodic payments associated with an offer to purchase. In one embodiment, the user is provided with an option to conclude the transaction for the selected listing based on a plurality of periodic payments. In certain embodiments, the network-based commerce facility is a web-based auction facility where the offers are in the form of bids. Accordingly, in this embodiment, the periodic payment may be a monthly payment and the products are movable goods such as motor vehicle, motorcycles, watercraft, or the like.

33 Claims, 8 Drawing Sheets

Fill out our application to see how much you can borrow...

Name: 118

Address: 120

Social Security Number: 122

Salary: 124

Employer: 126

Email Address: 128

Auction Facility will work with Bank Name to process your application quickly so your funding is ready when you find the vehicle that's right for you!

Your information will remain private as specified in our privacy statement.

All transmissions are encrypted and secured.

By clicking on "APPLY" you grant permission to the lender to pull your credit report.

APPLY 130

SYSTEM AND METHOD FOR SUBMITTING AN OFFER TO PURCHASE OVER A NETWORK-BASED COMMERCE FACILITY

CROSS-REFERENCE TO RELATED APPLICATION

The present application claims the benefit of the filing date of U.S. provisional application Ser. No. 60/438,607, entitled "SYSTEM AND METHOD FOR SUBMITTING AN OFFER TO PURCHASE OVER A NETWORK-BASED COMMERCE FACILITY", filed Jan. 7, 2003.

FIELD OF THE INVENTION

The present invention relates generally to purchasing products over a network-based commerce facility. More particularly, the invention relates to a system and method for submitting offers to purchase products offered via the Internet.

BACKGROUND

There is no question that the explosive growth of the Internet in recent years has changed classic business and economic models. One area in which this change has been noteworthy is in the auctioning of both new and used products (goods and/or services) via the Internet. Conventionally, participants provide incremental bids to purchase the product and, upon a bid being successful, the purchaser then pays the amount he or she bid to claim title to the product. Although the products offered for sale are usually goods, it is to be appreciated that the bidding procedure may apply equally to services.

When, for example, the product auctioned is a motor vehicle, the bidder may either pay cash for the vehicle or arrange independent finance for the vehicle. During the bidding process the bidder bids on a total purchase price and thus may be unaware of the monthly payment obligations if the purchase is to be financed.

SUMMARY OF THE INVENTION

According to one aspect of the present invention, there is provided a method to facilitate a transaction in a network-based commerce facility, the method including:

presenting a plurality of listings to a user;

monitoring selection of one of the plurality of listings by the user; and providing the user with an indication of an equivalent periodic payment of a plurality of periodic payments associated with an offer to purchase.

The method may include providing the user with an option to conclude the transaction for the selected listing based on the plurality of periodic payments. In one embodiment, the network-based commerce facility is a web-based auction facility, and the method includes receiving the offer in the form of a bid from the user based on a periodic payment. The periodic payment may be a monthly payment and the products may be movable goods.

The invention extends to a machine-readable medium embodying a set of instructions to facilitate a transaction in a network-based commerce facility and to system to facilitate a transaction in a network-based commerce facility.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

Described herein is a system and method, in accordance with an aspect of the present invention, to provide bidding on products up for auction based on a monthly payment. Throughout the following description specific details are set forth in order to provide a more thorough understanding of the invention. However, the invention may be practiced without these particulars. In certain instances, well known elements have not been shown or described in detail to avoid unnecessarily obscuring the present invention. Accordingly, the specification and drawings are to be regarded in an illustrative rather than a restrictive sense.

Figure 1:
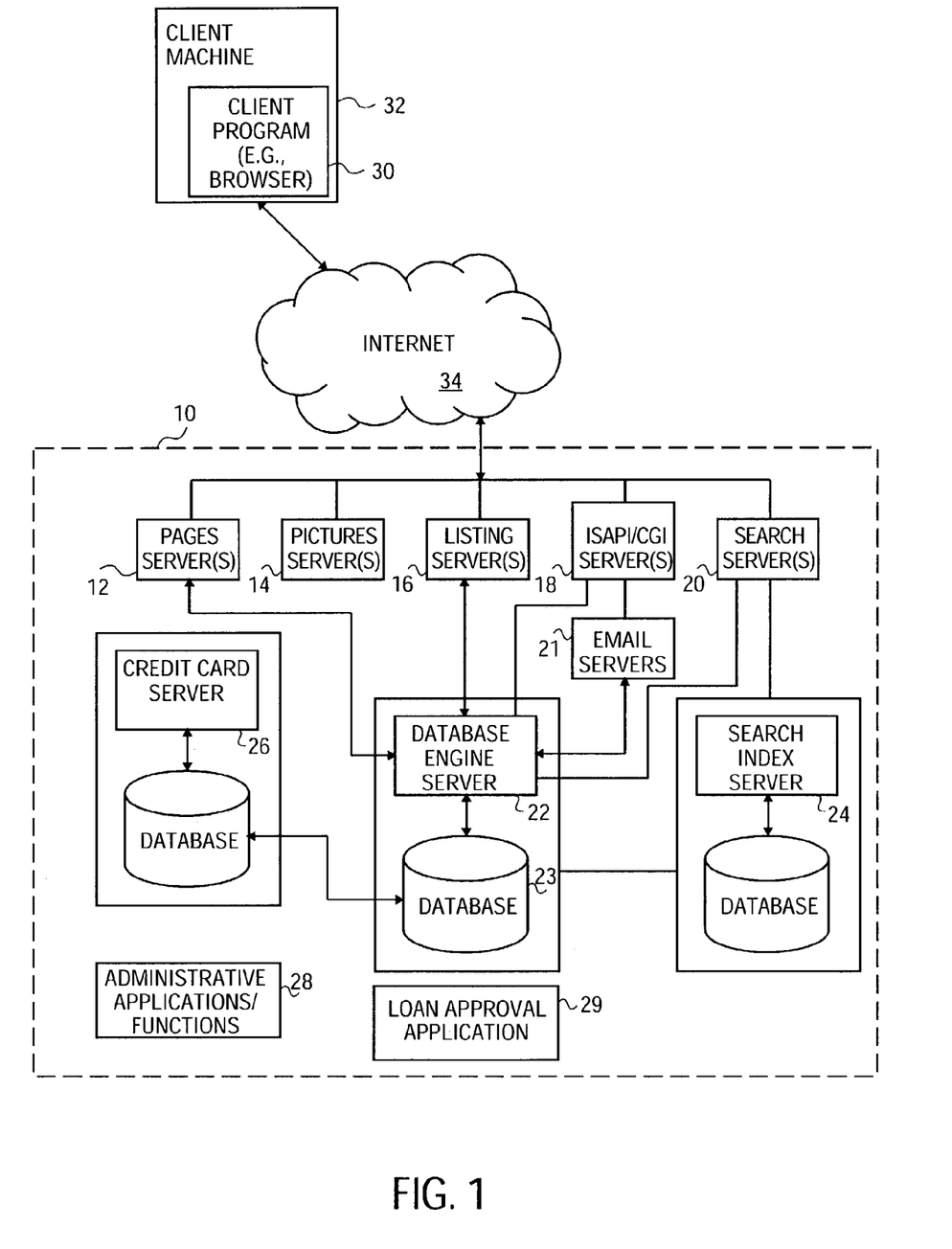
FIG. 1 shows a schematic block diagram of an exemplary network-based commerce facility in the form of a web-based auction facility according to one embodiment of the present invention.

Referring to FIG. 1, there is shown a schematic block diagram of an exemplary network-based commerce facility in the form of a web-based auction facility according to one embodiment of the present invention. While exemplary embodiments of the present invention are described within the context of an auction facility, it will be appreciated by those skilled in the art that the invention will find application in many different types of computer-based, and network-based, commerce facilities.

The auction facility has a system 10 including one or more of a number of types of front-end servers, namely page servers 12 that deliver web pages (e.g., markup language documents), picture servers 14 that dynamically deliver images to be displayed within Web pages, listing servers 16, ISAPI/CGI servers 18 that provide an intelligent interface to a back-end of the system 10, and search servers 20 that handle search requests to the system 10. A communication server including one or more e-mail servers 21 provides, inter alia, automated e-mail communications to users of the system 10.

The back-end includes a database engine server 22, a search index server 24 and a credit card database server 26, each of which maintains and facilitates access to a respective database. The back-end is also shown to include a number of administrative applications or functions 28 and a loan approval application 29, which is described in further detail below.

The web-based auction system 10 may be accessed by a client program 30, such as a browser (e.g., the Internet Explorer distributed by Microsoft Corp. of Redmond, Wash.) that executes on a client machine 32 and accesses the system 10 via a network such as, for example, the Internet 34. The auction system 10 may, for example, post listings of automobiles up for auction. However, unlike conventional network-based auctioned facilities in which a bidder bids a total purchase price of a product, the system 10 allows a user to bid on a monthly payment basis e.g. a monthly installment payment or a monthly lease payment. Further, in an automated fashion, the system 10 may in certain embodiments obtain approval for financing of the purchase.

Figure 2:
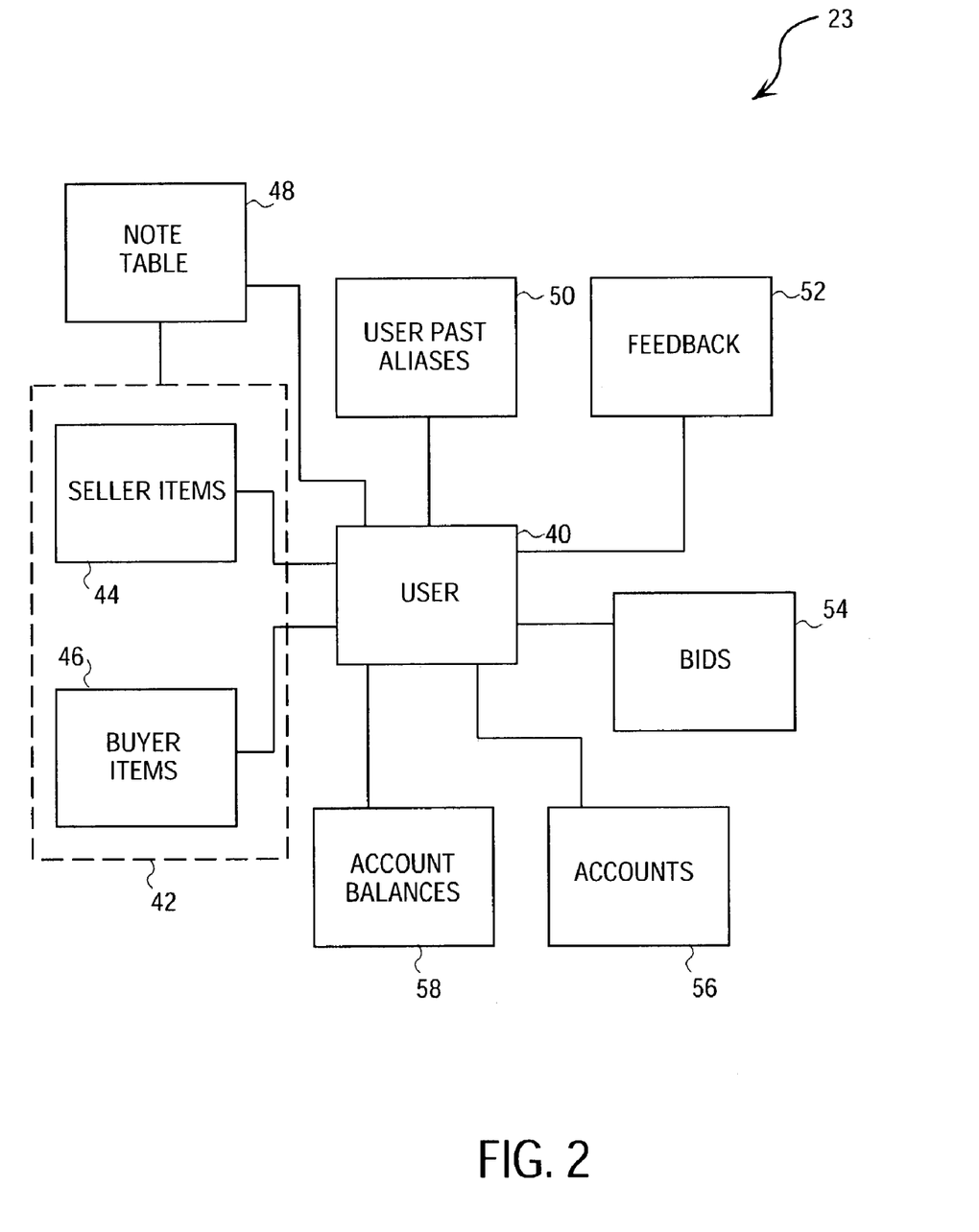
FIG. 2 shows a schematic diagram illustrating an exemplary database, maintained by, and accessed via a database engine server, that at least partially implements and supports a bid based on a monthly payment according to one embodiment of the present invention.

Prior to describing the methodology of offering products for sale based on a monthly payment, an exemplary database 23 of the system 10 is described with reference to FIG. 2. The database 23 is maintained by, and accessed via, the database engine server 22, which at least partially implements and supports the auction system 10. The database 23 is a relational database, and includes a number of tables having entries, or records, that are linked by indices and keys. Central to the database 23 is a user table 40, which contains a record for each user of the auction system 10. A user may operate as a seller, buyer, or both, within the auction system 10. The database 23 also includes item tables 42 that may be linked to the user table 40. Specifically, the items tables 42 include a seller items table 44 and a bidder items table 46. A user record in the user table 40 may be linked to multiple items that are being, or have been, auctioned via the system 10. A number of other exemplary tables are also shown to be linked to the user table 40, namely a note table 48, a user past aliases table 50, a feedback table 52, a bids table 54, an accounts table 56, and an account balances table 58.

Figure 3:
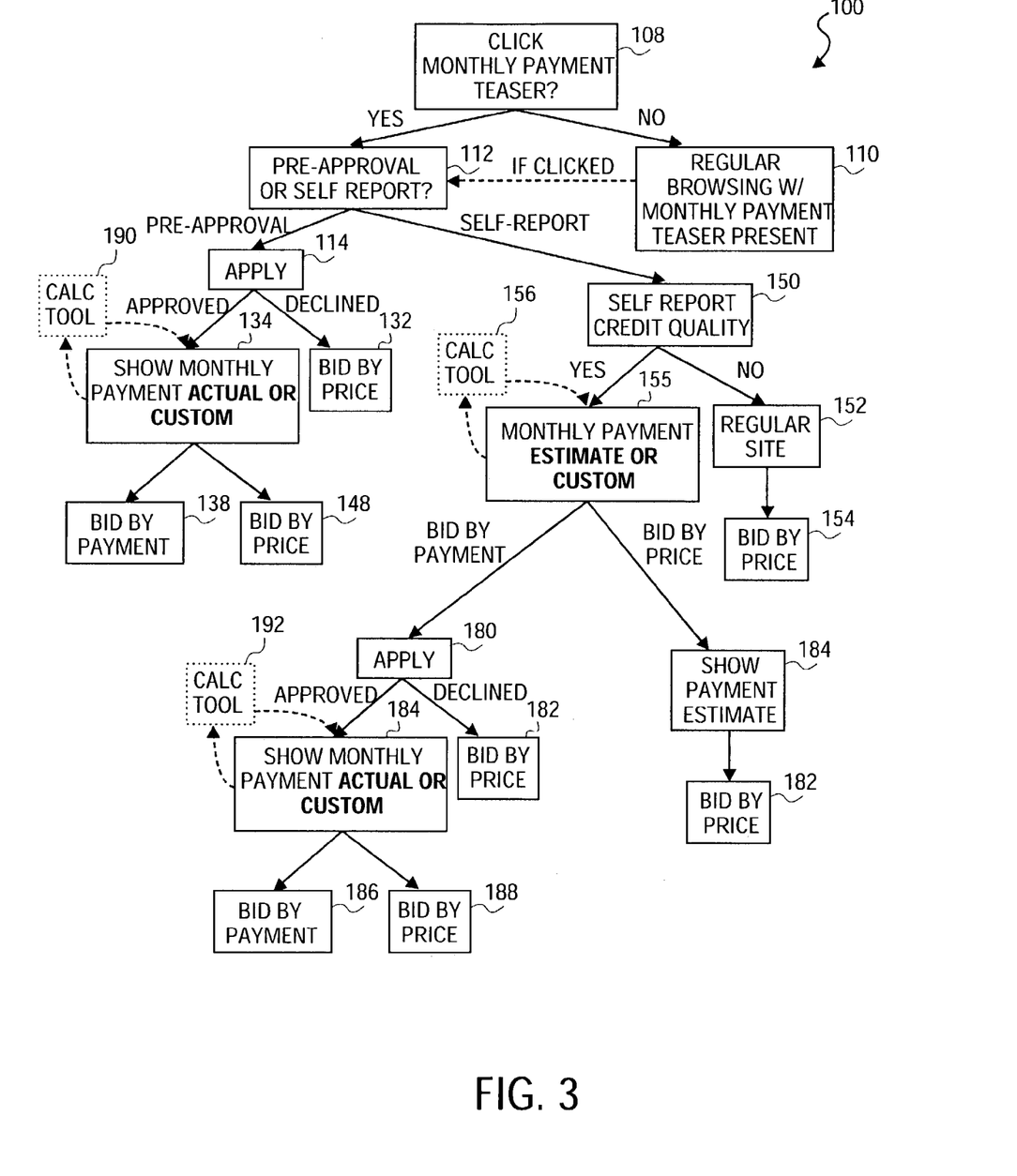
FIG. 3 shows a schematic flow diagram of an exemplary method, in accordance with the invention, for bidding on products auctioned via the Internet, e.g., via the web-based auction facility of FIG. 1.

Referring in particular to FIG. 3 of the drawings, reference numeral 100 generally indicates an exemplary method for a bidder or customer to bid on a product (e.g., goods and/or services) in a network-based auction facility such as the system 10. As mentioned above, unlike the methodology in conventional web-based auction facilities, the method 100 allows a bidder or user to bid in terms of a periodic payment, e.g., a monthly payment, instead of, or in addition to, a total purchase price payment used in conventional auctioning environments. In one exemplary embodiment, the products up for auction are motor vehicles and, accordingly, the monthly bid may include insurance costs, financing fees, an extended warranty service plan cost, or the like. Accordingly, in certain embodiments, the monthly payment bid by the user is the total monthly payment and in these embodiments, no hidden costs or additional costs (e.g. insurance costs) are due by the user.

In one embodiment, the listing servers 16 (see FIG. 1) include a front-end monthly payment engine that provides customized estimates of monthly payments (e.g., loan and/or lease) payments. When a user searches the system 10 from the client machine 32 for a particular product, e.g. a specific motor vehicle and selects a particular item (e.g. Ford Mustang GT convertible), a dynamic page 102 (see FIG. 6) is rendered to the client machine 32. A photograph of the item is also shown to the user. In one embodiment, the page 102 includes an option to bid on a total purchase price 104 based on an estimated monthly payment 106 presented to the user. In certain embodiments, the estimated monthly payment 106 defines a teaser, which the user may click on in block 108 of FIG. 3. If the user does not click on the teaser, then the method 100 is configured to provide regular browsing that may retain the monthly payment teaser in subsequent web pages for subsequent selection as shown in block 110.

If, for example, the user initially selects the monthly payment teaser in block 108, or subsequently selects the teaser during regular browsing in block 110, then a web page is rendered to the client machine 32 so that the user may select a "pre-approval option" or a "self-report option" as shown in block 112. As described in more detail below, in certain embodiments, the pre-approval option obtains, in an automated fashion, pre-approved financing for the user to purchase the particular product, such as the motor vehicle, based on the monthly payment bid by the user. However, the user may also choose to obtain financing independently of the network-based auction facility and, accordingly, the system 10 allows the user to enter terms of such financing, as described in more detail below.

Figure 4:
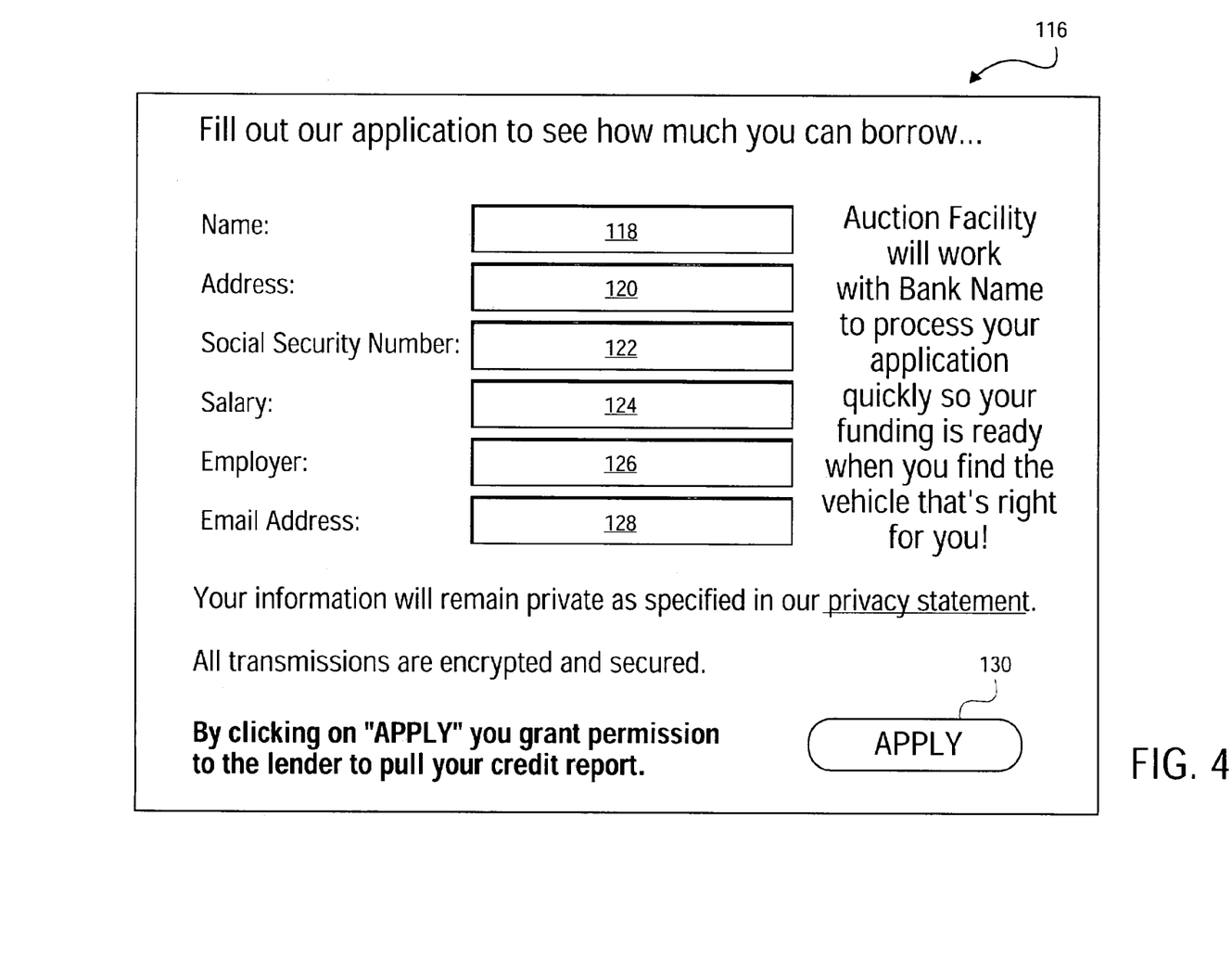
FIG. 4 shows a schematic screen shot of an exemplary credit application form generated by the method.

Returning to block 112, when the user selects the pre-approval option, an application procedure, as represented in block 114, is then carried out. In particular, the system 10 renders an application form 116 (see FIG. 4) to the user via the client program 30 on the client machine 32. In the application form 116, basic user particulars such as name 118, address 120, social security number 122, salary 124, employer 126, and email address 128 are requested from the user in order to process the loan application. It is to be appreciated that further or different particulars may be requested from the user in different embodiments.

In the embodiment depicted in the drawings, the system 10 interacts with an external banking facility to obtain financing for the purchase of the particular product. However, it is to be appreciated that financing may also be provided by the network-based auction facility or any other entity. In one embodiment the pre-approval option is in the form of a link to a financing partner. Communication of the user's personal particulars between the client machine 32 and the system 10 may be performed in a secure fashion.

Once the user has entered the requested particulars on the application form 116, the user activates an "APPLY" button 130 (see FIG. 4) whereupon the entered particulars are communicated from the client program 30 via the Internet 34 to the auction system 10, which processes the application either internally or by communicating with an external entity. In response to the communication, the system 10 either approves or declines the user's application. If, as shown in block 132, the user's application is declined, the method 100 allows the user to continue bidding by a total purchase price and, in certain embodiments, any representations on the web page offering financing to the user by means of a monthly payment are removed.

In the event of the loan application of the purchaser or user being pre-approved, in block 134 the method 100 renders a web page to the client machine 32 that shows a maximum monthly payment for which the user has been pre-approved based on his personal particulars. It is to be appreciated that, the web form 116 is merely an example of a loan application graphical user interface (GUI) and that further particulars required for approval of the user may be included in the form 116, as mentioned above. The purchaser or user is also advised of the pre-approved rate of financing. In certain embodiments, the user may also apply for financing through the system 10 after purchasing a product e.g.

after a successful bid on a motor vehicle. In certain circumstances, when automated financing for the particular user has been rejected, a finance and insurance center specialist may manually research options to try to obtain financing for the user. Typically, purchasers or users that require manual review are notified that a manual review is being performed and they may be provided with an estimated time by which approval, or denial thereof, will be communicated to them. In the event of the financing being approved, the finance and insurance center typically communicates the required application documentation to the user via email.

Figure 7:
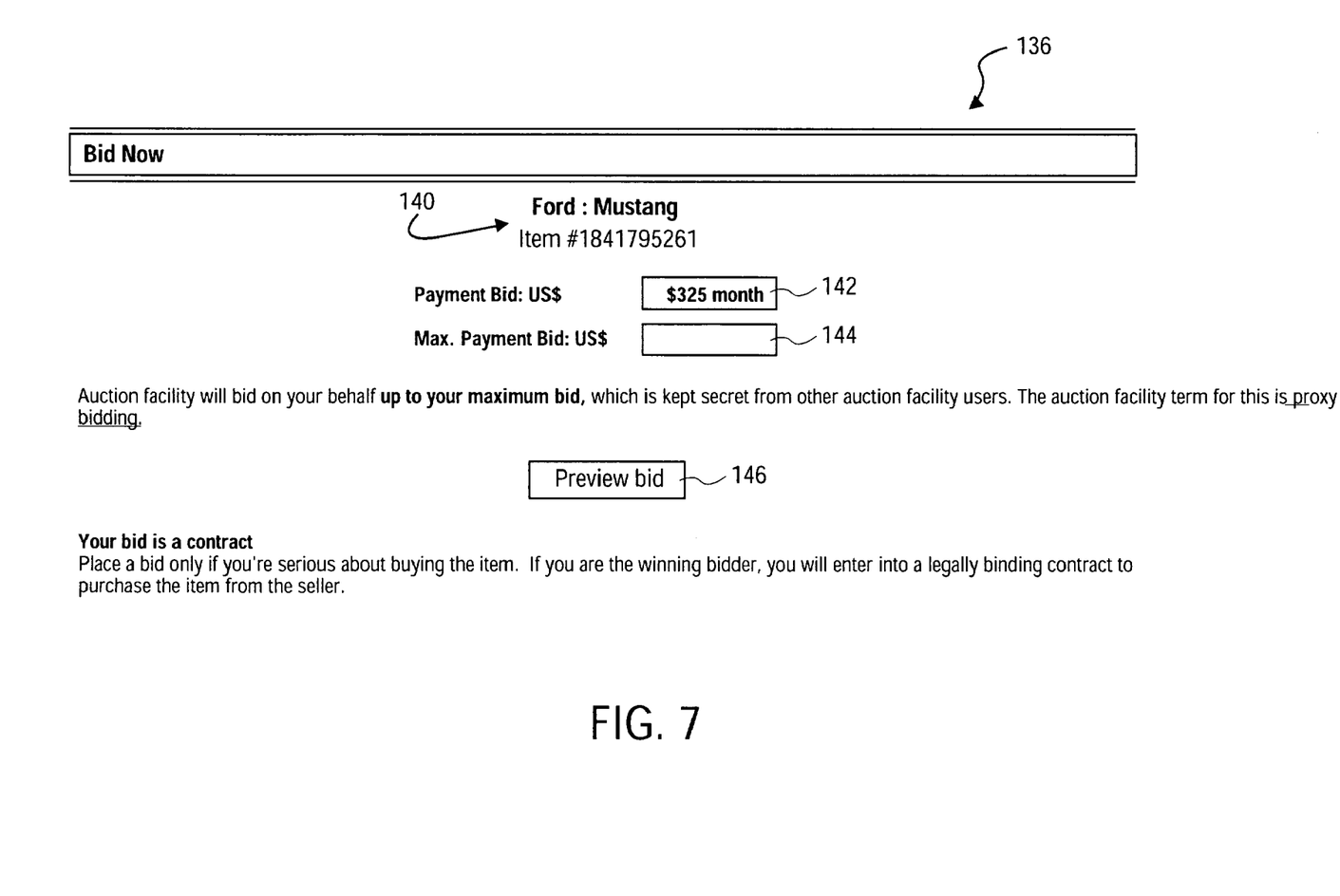
FIG. 7 shows a schematic screen shot of and exemplary web form for a user to enter a monthly bid and a maximum monthly bid.

Returning to block 134, in certain embodiments when the user has been informed of the approval of his or her application, and then bids on an item (e.g., the Mustang convertible in the present example), a monthly payment bid web page 136 (see FIG. 7) is rendered to the client machine 32 as shown in block 138 of FIG. 3. The monthly bid web page 136 identifies the product that the user is bidding on (see arrow 140 in FIG. 7) and provides the user with an option to enter a bid in block 142 as well as provide a maximum bid amount in block 144. In certain embodiments of the invention, the auction facility acts as a proxy bidder in which the network-based auction facility bids on behalf of the user up to the value of the maximum bid entered by the user in block 144. Accordingly, in certain embodiments, the user may enter a maximum bid or a maximum monthly payment bid, whereafter the system 10 bids in an automated fashion on behalf of the user. The monthly payment bid web page 136 provides a preview button 146 that allows the user to preview his or her bid. When a bid is initially placed, the user is presented a screen providing information including, for example, a maximum bid, a user ID, and item details. If all of the information is correct the user may then confirm his or her bid, and it will be placed into the system 10. The bid will also be presented as a monthly payment based on actual pre-approval terms, and the actual bid being placed on the item.

Although the method 100 carried out by the network-based auction facility allows the user to bid by a monthly payment (see block 138 in FIG. 3), the user may nevertheless still bid by a total purchase price should he or she so choose, as shown in block 148.

In one embodiment, the monthly bid may include finance costs, insurance costs, costs arising from the arranging of the finance, the sale of auto related insurance products such as extended service contracts (warranties or mechanical breakdown insurance), or the like. Accordingly, in some embodiments, the user may bid a total monthly cost for the particular product, which reflects his or her total monthly monetary outlay for a selected duration (e.g., 48 months). However, it is to be appreciated, that the monthly bid need not include any one or more of the aforementioned costs and, for example, may relate purely to a monthly payment on a loan for the purchase of the vehicle. Further, it is to be appreciated that in certain embodiments, the particular terms and conditions of the loan for purchase of the product (or products) are customized to the particular user or customer. Thus, in certain embodiments, one user may see a listing of a product with a corresponding monthly payment in the amount of $200, whereas another user bidding on the same item may see the same listing with a monthly payment of $150 because of, for example, a better credit rating. Thus, a common purchase price may be used to determine an equivalent monthly payment for a particular user based on the nature of financing terms.

Returning to block 112 in FIG. 3, instead of selecting the pre-approval option, the user may select to self-report his or her credit particulars as shown in block 150. Should the user subsequently decide not to self-report the credit particulars in block 150, the method 100 then configures the user experience to perform in a regular fashion at block 152 in which the user does not bid by a monthly payment but instead by a total purchase price as shown in block 154. In one embodiment, the monthly payment teaser (see block 108 and estimated monthly payment 106 in FIG. 7) is not included in the web page rendered to the user.

If, however, the user has selected the self-report option in block 150, the user may in block 155 be rendered a web page similar to the web page 136 to enable the user to enter a monthly bid in block 142. The monthly bid may either be an estimated monthly bid, e.g. using a calculator tool 156, or a customized monthly bid derived from details such as a user entered interest rate, period of financing, or the like.

Figure 5:
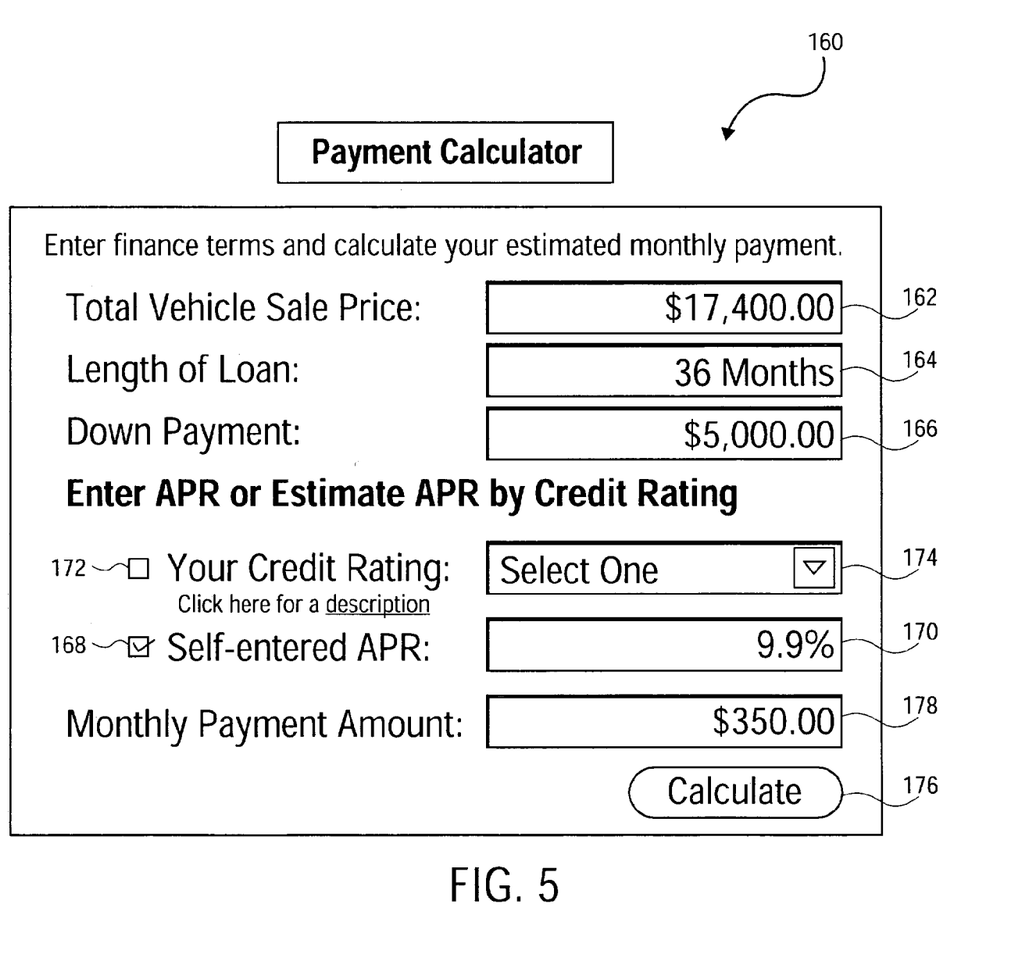
FIG. 5 shows a schematic screen shot of an exemplary payment calculator generated in the method.
Figure 6:
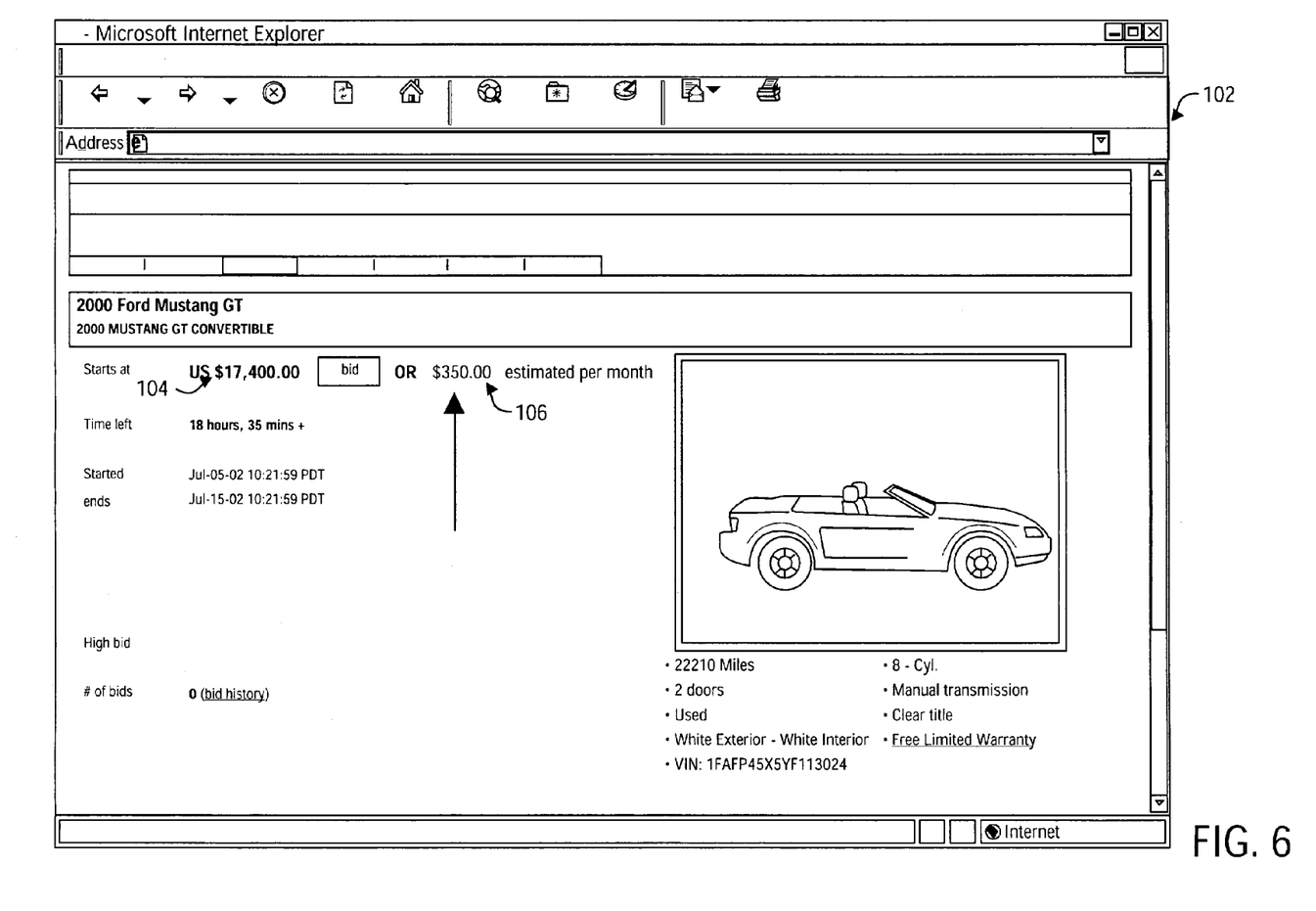
FIG. 6 shows a schematic screen shot of an exemplary web page rendered by the method showing a product listing, a starting bid and its equivalent monthly payment.

An exemplary payment calculator 160 generated by the calculator tool 156 is shown in FIG. 5. The payment calculator 160 is rendered as a web page to the client machine 32 for display by the client program 30. The payment calculator 160 includes a sale price field 162 for entry of the total sale price of the product which, in the present example, is a vehicle. The sale price field 162 may be automatically populated with the sale price of the vehicle selected by the user (FIG. 6). However, it is to be appreciated, that the user may also populate the sale price field 162. A term of loan field 164 and a down payment field 166 are also provided in the payment calculator 160 for entry of the loan term and a down payment amount. In one embodiment, the user enters the loan term and the down payment amount when the self-report functionality of the method 100 has been chosen by the user. Likewise, the user may select check box 168 and enter a credit rate in field 170 which the user deems appropriate for his or her particular circumstances. However, in certain embodiments, the user may check box 172 and, by using a drop down menu 174, select a credit rating which the user deems to apply to him or her thereby to obtain an estimate of an interest rate which he or she is likely to receive. In certain embodiments, the interest rate would then be automatically entered into the field 170. In the embodiment depicted in the drawings, the user may then activate a "Calculate" button 176 which then calculates and displays a monthly payment amount 178 which is based on the information entered by the user into the payment calculator 160.

Thus, the payment calculator 160 may be used to aid a user in estimating a monthly payment bid as shown in block 155. Once the user has estimated the monthly payment bid using the calculator tool 156, he or she may either apply for pre-approval in block 180, or bid a total purchase price as shown at block 182. Prior to bidding by a total purchase price in block 182 the method 100 also provides a payment estimate so that the total payment price is converted to a monthly payment price so that a user is aware of his or her monthly financial commitment as shown in block 184. In certain embodiments, in block 182 a link to apply for financing is provided to the user when bidding.

Returning to block 180, which corresponds substantially with the application process described in block 114 above, the user's application may either be approved or declined. If the user's application is declined the method 100 provides an option in block 182, which corresponds with block 132 above, to bid by a total purchase price. If, however, the user's application is approved, then the functionality carried out in blocks 184, 186 and 188 is performed. The blocks 184, 186, and 188 correspond with blocks 134, 138 and 148 as described above.

A calculation tool 190 associated with the monthly payment in block 134 and a calculation tool 192 associated with monthly payment in block 184, substantially resemble the calculation tool 156 and, in certain embodiments, may render a web page including a substantially similar web payment calculator 160 (see FIG. 5).

It will be appreciated that the methodology described above may be implemented in various different ways. For example, a secure credit application e.g. including the presentation of an application, its completion, submission and response back to the user may be accomplished with the use of cookies. In one embodiment, the system 10 integrates on the backend with a loan approval application 29 shown in FIG. 1 (e.g. an auto finance application). The loan approval application 29 may route an application and/or an electronic loan document to third party or entity.

In certain embodiments, the monthly payment engine may be included in the listing service 16. Thus, when browsing multiple items a monthly payment amount is presented next to the price of each of the items. The monthly payment amount is based on default terms, user specified terms, or personal pre-approval terms. Further, the monthly payment engine may, in certain embodiments, present default settings to the user such as a term of financing, a down payment amount, as well as a default interest rate based on current market factors. The user may however change the default settings should he or she so chose. In certain embodiments, the monthly payment functionality in blocks 134, 155, and 184 of FIG. 3 operate off backend inputs of rates and lending criteria from lending partners associated with the system 10. The rates and lending criteria may depend upon, or correspond to, a specific rating e.g. a credit score of the user, a length of credit history of the user, finance settings of a term, a down payment, an amount to be financed, or the like.

It is to be appreciated that the monthly bid made by the user may be a monthly lease payment. Further, the monthly payment bids may be made on any goods or services and is not restricted to the sale or lease of motor vehicles. For example, the monthly payment bid may be in respect of the lease of computer equipment, dwellings, boats or any other items. The products or items for sale or auction may be new and/or used items.

In certain embodiments, sellers of goods via the system 10 may provide a user or customer with financing. In these circumstances, the pre-approval application may be sent to the seller for approval. However, for example, in for sale by owner (FSBO) circumstances where a seller is unlikely to offer financing to the purchaser or user, the loan approval application 29 may interact with a third party lender.

Figure 8:
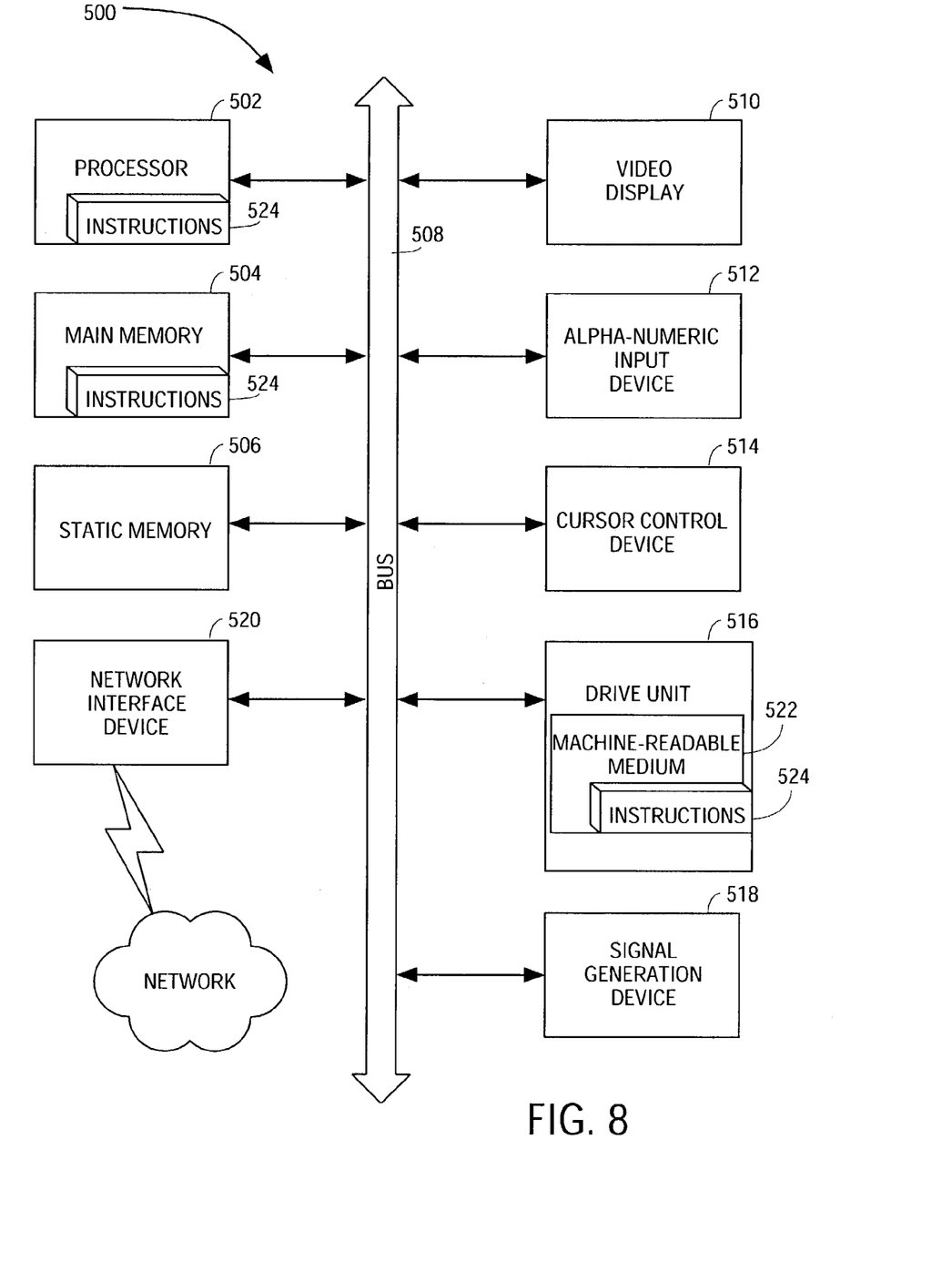
FIG. 8 shows a schematic high-level block diagram of an exemplary computer system.

FIG. 8 shows a diagrammatic representation of machine in the exemplary form of a computer system 500 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or cathode ray tube (CRT). The computer system 500 also includes an alphanumeric input device 512 (e.g. a keyword), a cursor control device 514 (e.g. a mouse) a disk drive unit 516, a signal generation device 518 (e.g. a speaker) and a network interface device 520.

The disk drive unit 516 includes a machine-readable medium 522 on which is stored a set of instructions (i.e., software) 524 embodying any one, or all, of the methodologies described above. The software 524 is also shown to reside, completely or at least partially, within the maim memory 504 and/or within the processor 502. The software 524 may further be transmitted or received via the network interface device 520. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to; solid-state memories, optical and magnetic disks, and carriers wave signals.

Thus, a method and a system for submitting offers to purchase products offered via a network-based commerce facility have been described with reference to specific exemplary embodiments. It will be evident that various modifications and changes may be made to these embodiments without departing from the broader spirit and scope of the invention. Accordingly, the specification and drawings are to be regarded in an illustrative rather than a restrictive sense.

What we claim is:

1. A computer implemented method to facilitate a transaction in a network-based auction facility, the method including:
presenting via a client computer a plurality of listings to a user;
monitoring selection of one of the plurality of listings by the user to identify a selected listing;
retrieving listing details of the selected listing from a database;
providing a graphical user interface to the user showing both the listing details of the selected listing and an indication of an equivalent periodic payment of a plurality of periodic payments associated with an offer to purchase; wherein the periodic payment is based on financing data and informs the user of the cost of the selected listing based on periodic payments;
presenting the user with a bid option on said graphical user interface, the bid option being an option to bid based on periodic payments; and
receiving at the network-based auction facility a bid from the user based on the option to bid based on periodic payments.

2. The method of claim 1, in which the user interface provides the user with an option to conclude the transaction for the selected listing based on the plurality of periodic payments.

3. The method of claim 1, wherein the network-based commerce facility is a web-based auction facility.

4. The method of claim 3, wherein the periodic payment is a monthly payment and the products are movable goods.

5. The method of claim 4, wherein the monthly payment is one of a lease payment and an installment sale payment.

6. The method of claim 3, which includes:
presenting the user with at least two bid options via the user interface, a first bid option being the bid option based on the periodic payment and the second bid option being an option to bid based on a single payment; and monitoring, via the user interface, selection of one of the first or the second bid options by the user.

7. The method of claim 6, wherein acceptance of a bid using the first bid option is dependent upon personal information of the user.

8. The method of claim 1, wherein the listings optionally have associated insurance costs, the monthly payment including the associated insurance costs.

9. The method of claim 1, which includes:
presenting the user with an option to obtain financing to finance the transaction associated with a listing;
presenting the user with an interface to obtain personal information of the user;
communicating a request for financing to a financing facility; and
selectively allowing the user to conclude the transaction based on the periodic payment.

10. The method of claim 9, wherein the network-based commerce facility is a web-based auction facility, the method including:
receiving financing data from the financing facility;
identifying from the financing data a maximum bid based on the periodic payment to effect the transaction, the maximum bid being uniquely associated with the user; and
allowing the user to bid on the listed item up to the maximum bid.

11. The method of claim 1, which includes presenting the user with a calculator interface to estimate the periodic payment.

12. A machine-readable medium embodying a set of instructions to facilitate a transaction in a network-based auction facility, the instructions when executed causing the machine to:
present via a client computer a plurality of listings to a user;
monitor selection of one of the plurality of listings by the user to identify a selected listing;
retrieve listing details of the selected listing from database;
provide a graphical user interface to the user showing both the listing details of the selected listing and an indication of an equivalent periodic payment of a plurality of periodic payments associated with an offer to purchase; wherein the periodic payment is based on financing data and informs the user of the cost of the selected listing based on periodic payments; and
present the user with a bid option on said graphical user interface, the bid option being an option to bid based on periodic payments; and
receive at the network-based auction facility a bid from the user based on the option to bid based on periodic payments.

13. The machine-readable medium of claim 12, wherein the user interface provides the user with an option to conclude the transaction for the selected listing based on the plurality of periodic payments.

14. The machine-readable medium of claim 12, wherein the network-based commerce facility is a web-based auction facility.

15. The machine-readable medium of claim 14, wherein the periodic payment is a monthly payment and the products are movable goods.

16. The machine-readable medium of claim 15, wherein the monthly payment is one of a lease payment and an installment sale payment.

17. The machine-readable medium of claim 16, wherein the instructions cause the machine to:
present the user with at least two bid options via the user interface, a first bid option being the bid option based on a periodic payment and the second bid option being an option to bid based on a single payment; and
monitor selection, via the user interface, of one of the first or second bid options by user.

18. The machine-readable medium of claim 17, wherein acceptance of a bid using the first bid option is dependent upon personal information of the user.

19. The machine-readable medium of claim 12, wherein the listings have associated insurance costs, the monthly payment including the associated insurance costs.

20. The machine-readable medium of claim 12, wherein the instructions cause the machine to:
present the user with an option to obtain financing to finance the transaction associated with a listing;
present the user with an interface to obtain personal information of the user;
communicate a request for financing to a financing facility; and
selectively allow the user to conclude the transaction based on the periodic payment.

21. The machine-readable medium of claim 20, wherein the network-based commerce facility is a web-based auction facility, the instructions causing the machine to:
receive financing data from the financing facility;
identify from the financing data a maximum bid based on the periodic payment to effect the transaction, the maximum bid being uniquely associated with the user; and
allow the user to bid on the listed item up to the maximum bid.

22. The machine-readable medium of claim 12, wherein the user is presented with a calculator interface to estimate the periodic payment.

23. A system to facilitate a transaction in a network-based auction facility, the system including:
an executable database stored in a computer readable medium including a plurality of listings; and
at least one server configured to:
selectively present via a client computer the plurality of listings to a user
monitor selection of one of the plurality of listings by the user to identify a selected listing;
provide a graphical user interface to the user showing both the listing details of the selected listing and an indication of an equivalent periodic payment of a plurality of periodic payments associated with an offer to purchase; wherein the periodic payment is based on financing data and informs the user of the cost of the selected listing based on periodic payments;
present the user with a bid option on said graphical user interface, the bid option being an option to bid based on periodic payments; and
receive at the network-based auction facility a bid from the user based on the option to bid based on periodic payments.

24. The system of claim 23, wherein the user is provided with an option to conclude the transaction for the selected listing based on the plurality of periodic payments.

25. The system of claim 23, wherein the network-based commerce facility is a web-based auction facility.

26. The system of claim 25, wherein the periodic payment is a monthly payment and the products are movable goods.

27. The system of claim 26, wherein the monthly payment is one of a lease payment and an installment sale payment.

28. The system of claim 27, wherein the at least one server:
presents the user with at least two bid options via the user interface, a first bid option being the bid option based on the periodic payment and the second bid option being an option to bid based on a single payment; and
monitors selection, via the user interface, of one of the first or the second bid options by the user.

29. The system of claim 28, wherein acceptance of a bid using the first bid option is dependent upon personal information of the user.

30. The system of claim 23, wherein the listings have associated insurance costs, the monthly payment including the associated insurance costs.

31. The system of claim 23, wherein the at least one server:
presents the user with an option to obtain financing to finance the transaction associated with a listing;
presents the user with an interface to obtain personal information of the user;
communicates a request for financing to a financing facility; and
selectively allows the user to conclude the transaction based on the periodic payment.

32. The system of claim 31, wherein the network-based commerce facility is a web-based auction facility, and the at least one server:
receives financing data from the financing facility;
identifies from the financing data a maximum bid based on a periodic payment to conclude the transaction, the maximum bid being uniquely associated with the user; and
selectively allows the user to bid on the listed item up to the maximum bid.

33. A system to facilitate a transaction in a network-based auction facility, the system including:
means for storing a plurality of listings;
means for selectively presenting via a client computer the plurality of listings to a user;
means for monitoring selection of one of the plurality of listings by the user to identify a selected listing;
means for providing a graphical user interface to the user showing both the listing details of the selected listing and an indication of an equivalent periodic payment of a plurality of periodic payments associated with an offer to purchase; wherein the periodic payment is based on financing data and informs the user of the cost of the selected listing based on periodic payments;
means for presenting the user with a bid option on said graphical user interface, the bid option being an option to bid based on periodic payments; and
means for receiving at the network-based auction facility a bid from the user based on the option to bid based on periodic payments.

* * * * *

UNITED STATES PATENT AND TRADEMARK OFFICE
CERTIFICATE OF CORRECTION

PATENT NO. : 7,222,092 B2 Page 1 of 1
APPLICATION NO. : 10/444916
DATED : May 22, 2007
INVENTOR(S) : Grove et al.

It is certified that error appears in the above-identified patent and that said Letters Patent is hereby corrected as shown below:

In column 9, line 47, in Claim 12, after "cost of the selected listing based on periodic payments;" delete "and".

In column 10, line 8, in Claim 17, after "or" insert -- the --.

In column 10, line 8, in Claim 17, after "by" insert -- the --.

Signed and Sealed this

Sixth Day of November, 2007

JON W. DUDAS
*Director of the United States Patent and Trademark Office*